(12) United States Patent
Tucker

(10) Patent No.: US 9,072,354 B1
(45) Date of Patent: Jul. 7, 2015

(54) HAIR WRAP

(76) Inventor: Cathy Tucker, Powder Springs, GA (US)

( * ) Notice: Subject to any disclaimer, the term of this patent is extended or adjusted under 35 U.S.C. 154(b) by 0 days.

(21) Appl. No.: 13/524,212

(22) Filed: Jun. 15, 2012

(51) Int. Cl.
*A45D 7/00* (2006.01)
*A45D 8/12* (2006.01)
*A45D 7/04* (2006.01)

(52) U.S. Cl.
CPC .......................................... *A45D 7/04* (2013.01)

(58) Field of Classification Search
USPC ........... 132/273, 275; 119/600, 601, 607, 619
See application file for complete search history.

(56) References Cited

U.S. PATENT DOCUMENTS

| | | | |
|---|---|---|---|
| 3,006,463 A * | 10/1961 | Bond et al. ................... | 428/40.4 |
| 4,552,802 A | 11/1985 | Mechin | |
| D345,644 S | 4/1994 | Harvie | |
| D347,311 S | 5/1994 | Butler | |
| 5,920,909 A | 7/1999 | Ellsworth et al. | |
| 7,634,819 B2 | 12/2009 | Grey | |
| 7,636,953 B2 | 12/2009 | Grey | |
| 2005/0236007 A1 | 10/2005 | Tokko | |
| 2006/0157077 A1 * | 7/2006 | Kraft et al. ..................... | 132/200 |
| 2008/0156340 A1 * | 7/2008 | Hopper et al. ................ | 132/275 |
| 2010/0294293 A1 | 11/2010 | Alex | |
| 2012/0234344 A1 * | 9/2012 | Hsu ............................... | 132/273 |
| 2013/0095300 A1 * | 4/2013 | Hatje et al. .................... | 428/189 |

* cited by examiner

*Primary Examiner* — Rachel Steitz
(74) *Attorney, Agent, or Firm* — J. T. Hollin, Attorney at Law, P.C.

(57) ABSTRACT

A method for grooming hair or fur, which includes the step of bundling the hair or the fur with a band including a self fusing silicone tape. The self fusing silicone tape adheres only to itself and not to any other objects so as to allow the self fusing silicone tape to wrap around the hair or the fur and be maintained therearound by merely adhering to itself, thereby eliminating a need for any foreign adherents and damage to the hair or the fur caused thereby.

4 Claims, 3 Drawing Sheets

HAIR WRAP

1. BACKGROUND OF THE INVENTION

A. Field of the Invention

The embodiments of the present invention relate to a band, and more particularly, the embodiments of the present invention relate to a self-adhering band[1] for adhering only to itself and not to any other objects and for bundling[2] hair or fur.

[1] See Oxford University Press Dictionary ("band:" "a flat, thin strip or loop of material used as a fastener, for reinforcement, or as decoration").

[2] See Oxford University Press Dictionary ("bundle:" "a collection of things or quantity of material tied or wrapped up together").

B. Description of the Prior Art

Numerous innovations for hair wraps/bands/scarfs have been provided in the prior art, which will be described below in chronological order to show advancement in the art, and which are incorporated in their entirety herein by reference thereto. Even though these innovations may be suitable for the specific individual purposes to which they address, nevertheless, they differ from the present invention in that they do not teach a self-adhering band for adhering only to itself and not to any other objects and for bundling hair or fur.

(1) U.S. Pat. No. 4,552,802 to Mechin.

U.S. Pat. No. 4,552,802—issued to Mechin on Nov. 12, 1985 in U.S. class 442 and subclass 37—teaches a self-adhesive product in the form of a sheet, band, or tape. It includes a cellular support coated with a layer of synthetic or natural elastomer previously treated by heating to a temperature between 70° and 160° C. followed by cooling. Application as dressing, packing sheet, or fixing tape.

(2) U.S. Pat. No. Des. 345,644 to Harvie.

U.S. Pat. No. Des. 345,644—issued to Harvie on Apr. 5, 1994 in U.S. class D2 and subclass 865—teaches the ornamental design for a hair wrap.

(3) U.S. Pat. No. Des. 347,311 to Butler. U.S. Pat. No. Des. 347,311—issued to Butler on May 31, 1994 in U.S. class D2 and subclass 871—teaches the ornamental design for a hair wrap.

(4) U.S. Pat. No. 5,920,909 to Ellsworth et al.

U.S. Pat. No. 5,920,909—issued to Ellsworth et al. on Jul. 13, 1999 in U.S. class 2 and subclass 171—teaches a hair wrap that confines the hair of the wearer while the wearer is engaged in activities where the wearer desires to keep her/his hair confined and not falling over her/his face or otherwise interfering with such activities. Preferably, the hair wrap is annular with upper and lower annular edges, having elastic therein, defining upper and lower expandable openings that permit the hair wrap to be placed over the head and down around the neck of the wearer. A pliable material, intermediate the upper and lower annular edges of the hair wrap, provides a pocket at the rear of the hair wrap for receiving the hair of the wearer. In use, the hair wrap is passed over the head and down around the neck of the wearer, with the hair of the wearer extending over the rear portion of the hair wrap. The front of the hair wrap is then raised above the forehead, and the hair extending over the rear of the hair wrap is inserted into the rear pocket of the hair wrap to confine the hair.

(5) United States Patent Application Publication Number 2005/0236007 to Tokko.

United States Patent Application Publication Number 2005/0236007 published to Tokko on Oct. 27, 2005 in U.S. class 132 and subclass 201—teaches a device and a method for handling decorative hair. The decorative hair is connected to the natural hair with a sleeve. The device includes a first body, a recess provided in the first body for receiving the sleeve and holding the sleeve, and a second body. A projection is provided on the second body, and is tapered toward the free end of the projection. The projection is inserted into the flattened sleeve to open the sleeve and to disconnect the decorative hair from the natural hair. The recess has a through hole into which the projection is inserted. A guide hole extends from the through hole so that the sleeve and the decorative hair or the natural hair held by the sleeve can enter into the through hole. The recess and the projection are provided on the ends of two pivoting handles.

(6) U.S. Pat. No. 7,634,819 to Grey.

U.S. Pat. No. 7,634,819—issued to Grey on Dec. 22, 2009 in U.S. class 2 and subclass 207—teaches a head wrap or scarf in a single layer having a first side that is more slippery against another surface, and a second side that is rougher and less slippery than the first side. The single layer is formed of two fibers of two different materials, with a greater proportion of a first slippery fabric toward the first side of the head wrap, and with a greater proportion of rougher fabric toward the second side of the head wrap.

(7) U.S. Pat. No. 7,636,953 to Grey.

U.S. Pat. No. 7,636,953—issued to Grey on Dec. 29, 2009 in U.S. class 2 and subclass 207—teaches a head wrap or scarf assembled from two parts joined on a seam line. Each of the parts is a single layer thick with more slippery fibers on one side and less slippery fibers on the other side. The parts are joined with the more slippery side of one part and the rougher side of the other part facing toward each side of the scarf so that when the scarf is folded, one outward facing surface is slippery and the outward facing surface is rougher.

(8) United States Patent Application Publication Number 2010/0294293 to Alex.

United States Patent Application Publication Number 2010/0294293—published to Alex on Nov. 25, 2010 in U.S. class 132 and subclass 54—teaches a hair band including a strip-shaped carrier structure, and several hairs that extend from the carrier structure in a main direction running perpendicular to the direction of main extension of the carrier structure. The ends of single hairs are stitched through the elastic foil forming the outer layer of the carrier structure, and are fixed to the carrier structure by gluing them to the foil only. The fixed ends of the hairs, at the back side of the foil, also run in the main direction of the hairs.

It is apparent that numerous innovations for hair wraps/bands/scarfs have been provided in the prior art, which are adapted to be used. Furthermore, even though these innovations may be suitable for the specific individual purposes to which they address, nevertheless, they would not be suitable for the purposes of the embodiments of the present invention as heretofore described, namely, a self-adhering band for adhering only to itself and not to any other objects and for bundling hair or fur.

2. SUMMARY OF THE INVENTION

Thus, an object of the embodiments of the present invention is to provide a self-adhering band for adhering only to itself and not to any other objects and for bundling hair or fur, which avoids the disadvantages of the prior art.

Briefly stated, another object of the embodiments of the present invention is to provide a method for grooming hair or fur, which includes the step of bundling the hair or the fur with a band including a self fusing silicone tape. The self fusing silicone tape adheres only to itself and not to any other objects so as to allow the self fusing silicone tape to wrap around the hair or the fur and be maintained therearound by merely adhering to itself, thereby eliminating a need for any foreign[3] adherents and damage to the hair or the fur caused thereby.

[3] See Oxford University Press Dictionary ("foreign:" "coming or introduced from outside; strange and unfamiliar to; not belonging to or characteristic of").

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying figures of the drawing.

3. BRIEF DESCRIPTION OF THE FIGURES OF THE DRAWING

The figures of the drawing are briefly described as follows.

4. LIST OF REFERENCE NUMERALS UTILIZED IN THE FIGURES OF THE DRAWING

Figure 1:
FIG. 1 is a diagrammatic perspective view of the self-adhering band of the embodiments of the present invention adhering only to itself and not to any other objects and bundling fur.

A. Introductory.
10 self-adhering band of embodiments of present invention for adhering only to itself and not to any other objects and for bundling hair 12 or fur 14
12 hair
14 fur
B. Configuration of self-adhering band 10.
16 self fusing silicone tape for adhering only to itself and not to any other objects and for bundling hair 12 or fur 14
18 band of self fusing silicone tape 16 for adhering only to itself and not to any other objects and for bundling hair 12 or fur 14
20 additional decorative objects
22 bow of additional decorative objects 20

5. DETAILED DESCRIPTION OF THE PREFERRED EMBODIMENTS

A. Introductory.

Figure 2:
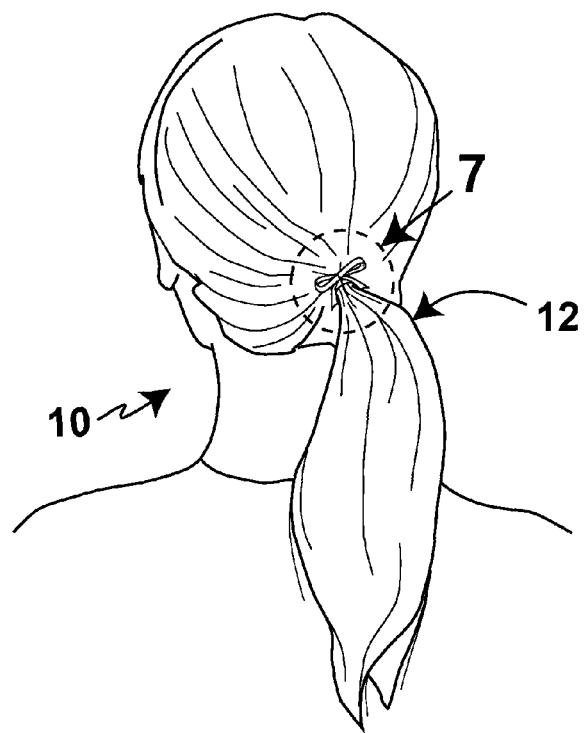
FIG. 2 is a diagrammatic perspective view of the self-adhering band of the embodiments of the present invention adhering only to itself and not to any other objects and bundling hair.

Referring now to the figures, in which like numerals indicate like parts, and particularly to FIGS. 1 and 2, which are, respectively, a diagrammatic perspective view of the self-adhering band of the embodiments of the present invention adhering only to itself and not to any other objects and bundling fur, and a diagrammatic perspective view of the self-adhering band of the embodiments of the present invention adhering only to itself and not to any other objects and bundling hair, the self-adhering band of the embodiments of the present invention is shown generally at 10 for adhering only to itself and not to any other objects and for bundling hair 12 or fur 14.

B. Configuration of the Self-Adhering Band 10.

Figure 3:
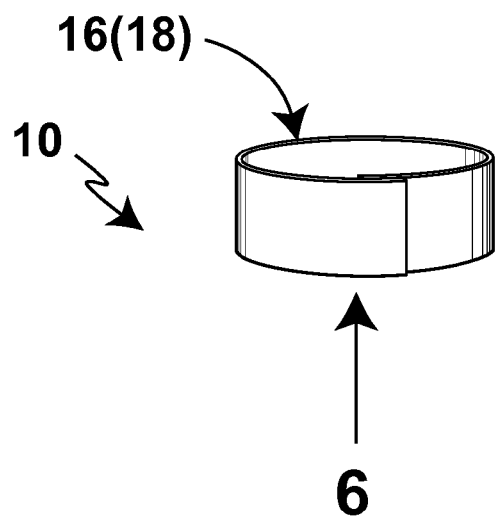
FIG. 3 is an enlarged diagrammatic perspective view of the area generally enclosed by the dotted circle identified by ARROW 3 in FIG. 1 of the self-adhering band of the embodiments of the present invention.
Figure 4:
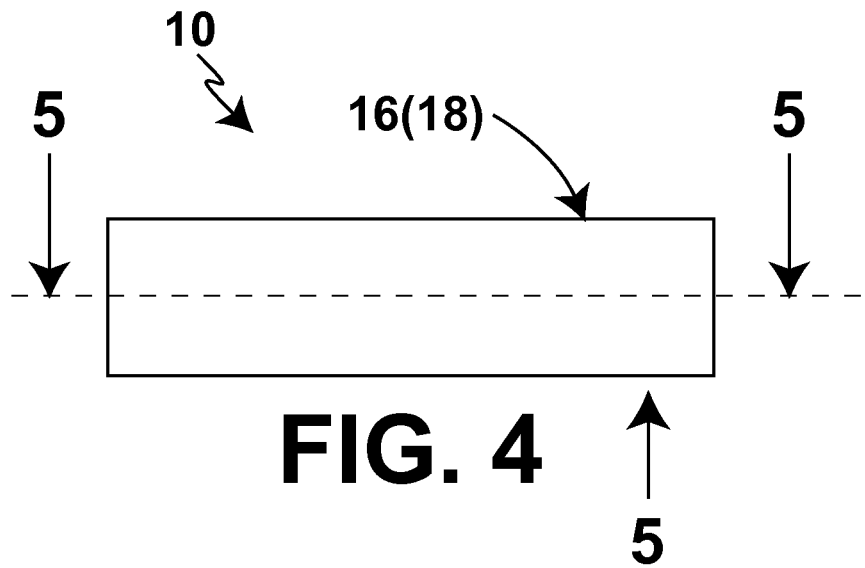
FIG. 4 is an enlarged diagrammatic side elevational view of the self-adhering band of the embodiments of the present invention shown in FIG. 3, but unwrapped and flattened.
Figure 5:
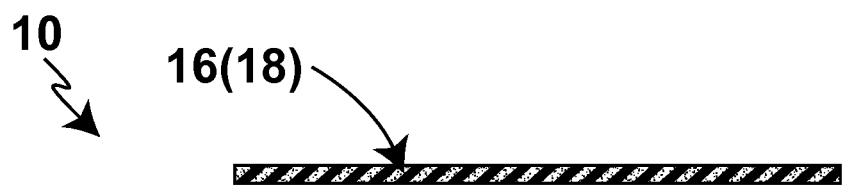
FIG. 5 is a diagrammatic cross sectional view taken along LINE 5-5 in FIG. 4.
Figure 6:
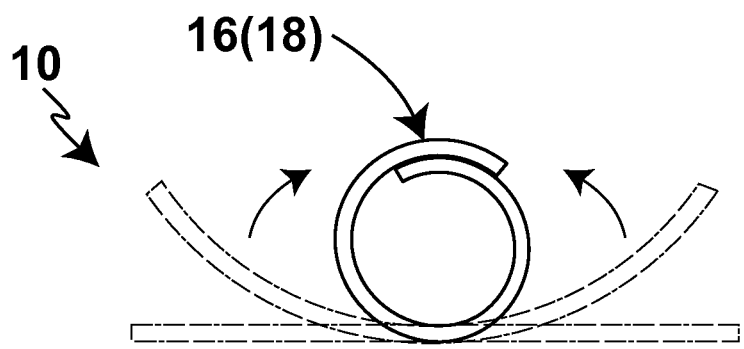
FIG. 6 is a diagrammatic bottom plan view taken generally in the direction of ARROW 6 in FIG. 3.

The configuration of the self-adhering band 10 can best be seen in FIGS. 3-6, which are, respectively, an enlarged diagrammatic perspective view of the area generally enclosed by the dotted circle identified by ARROW 3 in FIG. 1 of the self-adhering band of the embodiments of the present invention, an enlarged diagrammatic side elevational view of the self-adhering band of the embodiments of the present invention shown in FIG. 3, but unwrapped and flattened, a diagrammatic cross sectional view taken along LINE 5-5 in FIG. 4, and a diagrammatic bottom plan view taken generally in the direction of ARROW 6 in FIG. 3, and as such, will be discussed with reference thereto.

The self-adhering band 10 comprises a self fusing silicone tape 16. The self fusing silicone tape 16 is available from Horizon Tape Products Company, 6288 Claude Way E., St. Paul, Minn. 55076.

The self fusing silicone tape 16 is a band 18. The band 18 of the self fusing silicone tape 16 adheres only to itself and not to any other objects, and therefore, is excellent for bundling the hair 12 or the fur 14.

Thus, a method for grooming the hair 12 or the fur 14 includes the step of bundling the hair 12 or the fur 14 with the band 18 which includes the self fusing silicone tape 16.

The self fusing silicone tape 16 adheres only to itself 16 and not to any other objects so as to allow the self fusing silicone tape 16 to wrap around the hair 12 or the fur 14 and be maintained therearound by merely adhering to itself 16, thereby eliminating a need for any foreign adherents and damage to the hair 12 or the fur 14 caused thereby.

Figure 7:
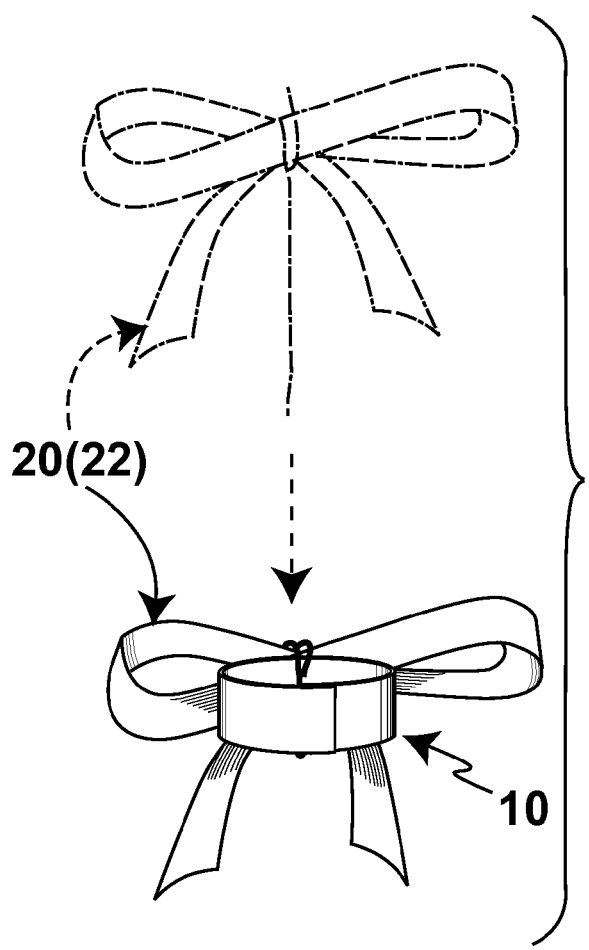
FIG. 7 is an enlarged diagrammatic perspective view of the area generally enclosed by the dotted circle identified by ARROW 7 in FIG. 2 of the self-adhering band of the embodiments of the present invention, which has an additional object attached thereto.

As shown in FIG. 7, which is an enlarged diagrammatic perspective view of the area generally enclosed by the dotted circle identified by ARROW 7 in FIG. 2 of the self-adhering band of the embodiments of the present invention, which has an additional object attached thereto, the self-adhering band 10 can be supplemented by additional decorative objects 20 attached thereto, such as a bow 22, but is not limited to that.

Applicant Tucker relies upon a new use (bundling the hair 12 or the fur 14) for a known material (the band 18 of the self fusing silicone tape 16).

At least until 1969, standard textbook law and routine Patent Office rulings have been that one cannot rely for novelty on a statement of intended use in the preamble of a claim, some times called a "label claim."

Instead, one would need to employ a "new use" claim, which is nothing more than an ordinary method claim, the main difference being that the novel feature is not, or need not be, in the manipulation steps of the method. Rather, the novelty may reside in the use of the old combination for a new purpose.

This doctrine, that one cannot claim an old material as a composition by stating an intended new use in the preamble, has sometimes been stated that one cannot patent a new use for an old material. This is misleading because new uses have long been patentable as methods. In fact, many method claims inherently involve new uses for old materials.

Since 1952, the statute, 35 U.S.C. 100(b), has expressly covered this by stating that the word "process" includes:

"a new use of a known process, machine, manufacture, composition of matter, or material."[Emphasis added]

In this regard the Examiner's attention is respectfully directed to Gottchalk, *The Term "Process" Includes a New Use,* 40 JPOS 451 (1958); and Hewitt, *The New use Patent,* 51 jpos 634 (October 1969).

C. Impressions.

It will be understood that each of the elements described above or two or more together may also find a useful application in other types of constructions differing from the types described above.

While the embodiments of the present invention have been illustrated and described as embodied in a self-adhering band for adhering only to itself and not to any other objects and for bundling hair or fur, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

What is claimed is:

1. A method for grooming hair growing from the scalp of a person or fur growing from the skin of an animal, which comprises the step of bundling the hair or the fur with a band comprising a self fusing silicone tape; wherein the self fusing silicone tape adheres only to itself and not to the hair or fur or any other objects so as to provide a means by which the self fusing silicone tape may be wrapped around the hair or the fur and be maintained therearound by merely adhering to itself, thereby eliminating a need for any foreign adherents and further, preventing any damage to the hair or the fur which may have otherwise been caused thereby.

2. A method for grooming or styling hair growing from the scalp of a person, comprising the steps of
  (a) bundling at least one selected grouping of such hairs within one hand of the groomer, according to the discretion of the groomer, (b) providing a hand of material of desired length, width, and thickness said band consisting of self-fusing silicone tape, wherein said band of silicone tape possesses the qualities of non-adherence to any substance, object, or material except itself; (c) wrapping, with the assistance of the opposite hand of the groomer, a first segment of the band of material about the selected grouping of said hairs; and (d) pressing any portion of the length of the remaining segment of said band of material about the first segment of said band of material, thereby rendering the hair in a desired bundling arrangement, and (e) repeating the first four steps enumerated above for as many groupings of said hair as deemed necessary.

3. A method for preventing, damage to, or accidental detachment of human hairs from a person's scalp during the course of grooming by means of bundling at least one grouping of said hair, comprising the steps of (a) bundling a selected grouping of such hairs within one hand of the groomer according to the discretion of the groomer, (b) selecting a band of material of desired length, width, and thickness said band consisting of self-fusing silicone tape, wherein said band of silicone tape possesses the qualities of non-adherence to any substance, object, or material except itself, (c) wrapping, with the assistance of the opposite hand of the groomer, a first segment of the band of material about the selected grouping of said hairs; and (d) pressing any portion of the length of the remaining segment of said band of material against the first segment of said band of material, thereby rendering the hair in a desired bundling arrangement.

4. The method as in claim 3, wherein the selected grouping or groupings to be bundled are those hairs or fur of an animal's scalp or skin, whereby said hairs or fur are thereby protected from damage to, or accidental detachment of, said hairs or fur.

* * * * *